May 20, 1924.  
A. J. LOVE  
RAT TRAP  
Filed April 11, 1923  
1,494,853  
3 Sheets-Sheet 1
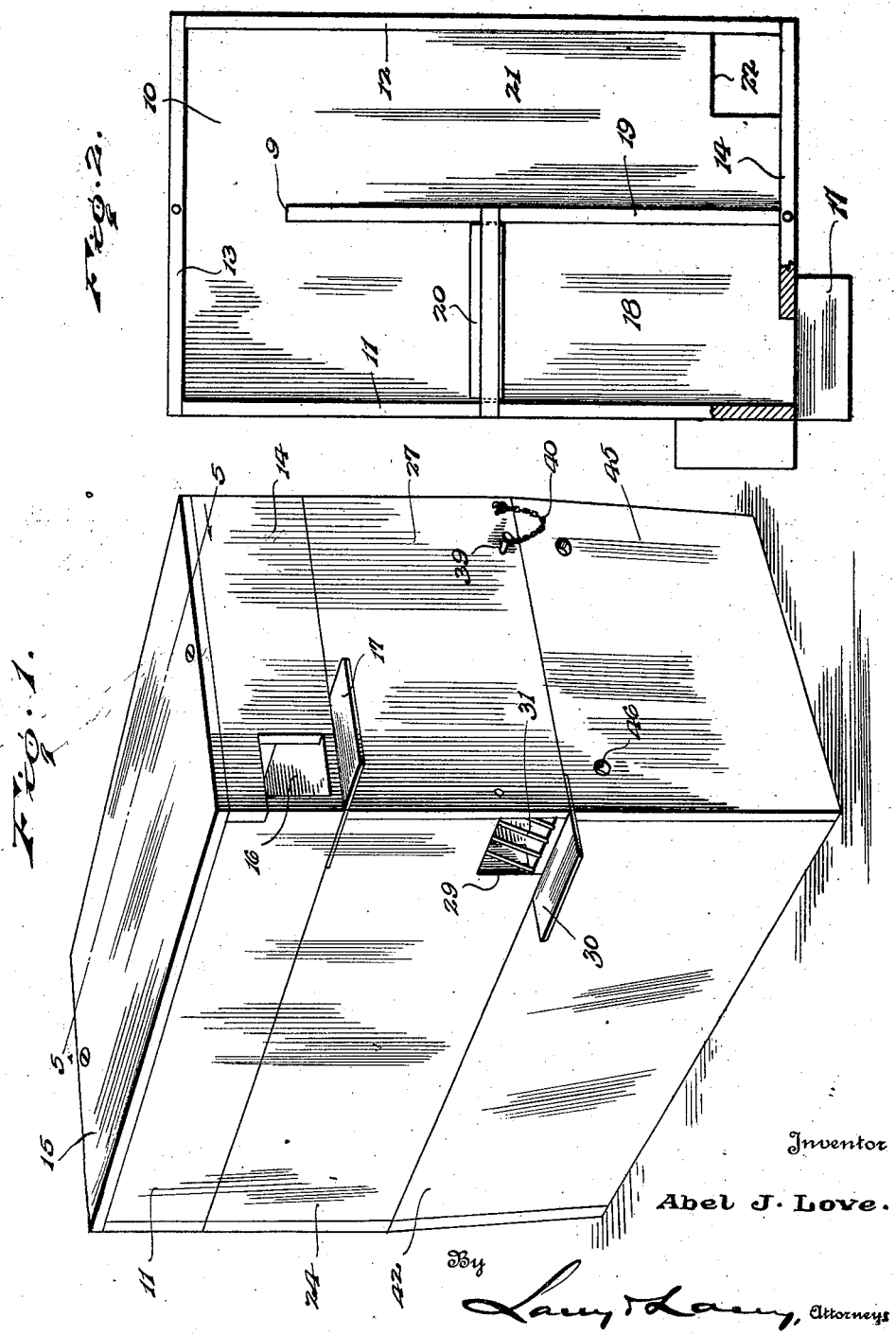
Inventor  
Abel J. Love.  
By  
Attorneys

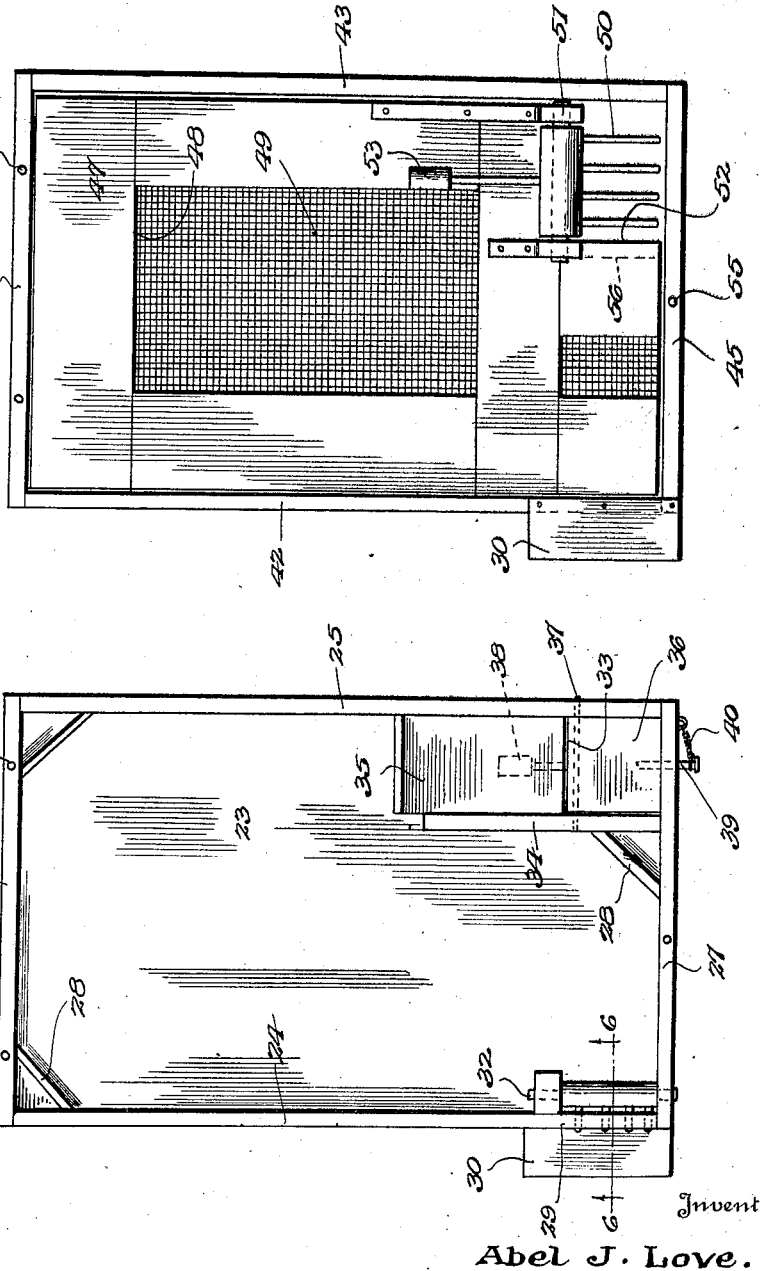

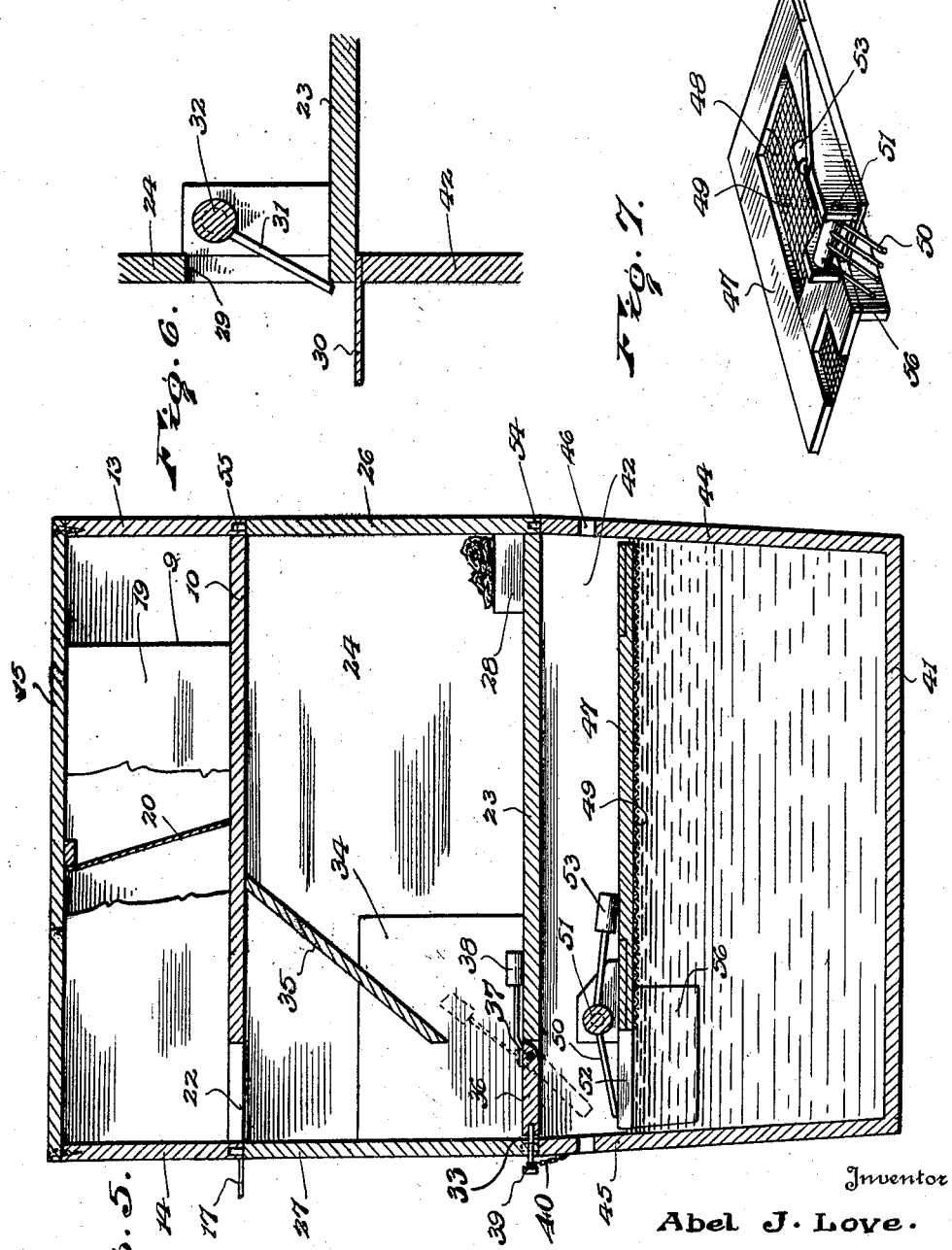

Patented May 20, 1924.

1,494,853

UNITED STATES PATENT OFFICE.

ABEL J. LOVE, OF CLINTON, NEBRASKA.

RAT TRAP.

Application filed April 11, 1923. Serial No. 631,397.

*To all whom it may concern:*

Be it known that I, ABEL J. LOVE, a citizen of the United States, residing at Clinton, in the county of Sheridan and State of Nebraska, have invented certain new and useful Improvements in Rat Traps, of which the following is a specification.

The present invention relates to rat traps, and the main object of the invention is to provide a trap that will not scare the rats away after one or more have been caught.

The trap is preferably built in three stories of which the top story forms the entrance hall, the middle story an intermediary chamber where the bait is placed, and the bottom story contains a tank into which the rat will drop down from the second story. Each story is built in the shape of a box and is separable from the other stories, while the top story has a porch with an entrance opening, the middle story has an exit, but the bottom story has neither entrance nor exit outwardly.

In the accompanying drawings one embodiment of the invention is illustrated, and;

Figure 1 is a perspective view of the trap erected;

Figure 2 is a horizontal plan view of the third story or box with the top removed;

Figure 3 is a top plan view of the middle story or box;

Figure 4 is a top plan view of the bottom story or box;

Figure 5 is a vertical section along line 5—5 of Figure 1;

Figure 6 is a fragmentary section along line 6—6 of Figure 3, showing an exit in the midlde story; and Figure 7 is a perspective view of the float with a gate for the bottom box or story.

Referring particularly to Figures 1, 2 and 5, the top story is built in box shape with a floor 10 and having two side walls 11 and 12 and two end walls 13 and 14. This box is covered with a top 15 secured by means of screws engaging in the end walls. At one corner in the end wall 14 is provided a doorway 16, with a small balcony 17 outside. This forms the entrance to the trap and leads into a small compartment 18 divided off from the rest of the box by a longitudinal partition 19. Between this partition 19 and the side wall 11 is hung a curtain 20, which is preferably of soft material and permits the passing in both directions in and out of the compartment 18. The partition 19 extends within a short distance of the end wall 13 providing a passage 9 to the long compartment 21 formed between the side wall 12 and the partition 19. At the corner formed between this side wall 12 and the end wall 14 is provided an opening 22 in the floor 10 leading to the middle box or story from the upper box.

The middle box is of similar construction to the upper one and consists of a floor 23, side walls 24 and 25, and end walls 26 and 27. The corners may have bait pockets 28, as seen in Figure 3. At the corner formed between the end wall 27 and the side wall 24 is formed in the latter, an exit 29 which leads out to a small balcony 30. Across this exit is hung a gate 31 on a spindle 32 in suitable bearings in the walls. This gate is preferably formed of rods or wire and opens outwardly only, and works easily enough to close by its own weight.

In the corner formed between the end wall 27 and the side wall 25, is provided a floor opening 33 extending between the side wall 25 and the low partition 34 reaching from the floor 23 part way up on the wall 27 to which it is secured. Between the partition 34 and the side wall 25 is inserted a short chute 35 pointing in the direction of the opening 33 in the floor. The opening 33 is covered by a shutter 36 hinged as at 37 in the side wall 25 and partition 34, and balanced by a counterweight 38 extending inwards in the box under the chute 35. This weight 38 tends to keep the shutter 36 in closed position and the chute 35 forms a stop against which, the weight 38 abuts, when the shutter drops down through the opening 33. Reference numeral 39 represents a latch bolt secured to the end wall 27 by means of a chain 40 and engaging in suitable apertures in the end wall, so as to engage with the shutter 36 to keep the same closed.

The bottom story or box, best seen in Figures 1, 4 and 5 actually forms a tank and has, for that reason, to be water tight. It has a floor 41, side walls 42 and 43, and end walls 44 and 45. There are no entrance or exit openings in this tank, but the end walls 44 and 45 are preferably perforated as at 46, furnished for the purpose of draining the overflow of the liquid in the tank and to keep its surface below a certain level. During warm weather the tank may be filled with water, but during the cold season kerosene, brine, or some other non-freezing liquid is preferably supplied.

A frame 47 constructed of some light material that will float in the tank has a central opening 48 covered by a mesh of metallic wire 49, and has at one corner a trap gate 50 preferably made of wire and journaled as at 51. This gate is intended to close the opening 52 formed in the corner of the frame 47, positioned directly under the opening 33 in the floor of the middle box. This gate 50 is closed by a counterweight 53. Alongside of the opening 52 is placed a partition 56 depending from the frame 47 into the liquid in the tank.

The boxes are placed one on top of the other and are provided with small pegs 54 and 55 for engaging in corresponding recesses in the box next above, as best seen in Figure 5.

In using the trap, the boxes are assembled, as best seen in Figures 1 and 5, and with the bolt 39 locking the shutter 36, so that, temporarily, there is no communication between the middle and the bottom boxes. The bait is placed anywhere in the middle box, as, for instance, at the corners in the pockets 28 or directly on the shutter 36, and to begin with the rats have free use of the two upper stories and are permitted to play and run about as they like and may enter or leave through the entrance opening 16 in the upper box or run out through the exit opening 29 without hindrance. As the shutter 36 is locked by a bolt 39, the rats will feel secure and make themselves at home in the middle box of the trap.

After some time when the trap does not scare the rats, the bolt 39 is withdrawn, so that the first rat that runs onto the shutter 36 will trip it and fall on the gate 50, which also will yield under the weight of the animal, which will then fall through the frame 47 into the liquid below. In an attempt to escape, the rat will then swim about in the liquid, but on account of the wire frame placed thereon, he will not be able to escape and will therefore quickly drown. The depending partition 56 will prevent him from returning under the gate 50 or his dead body from obstructing the falling in of other rats.

The uppermost story or box is comparatively shallow, but the middle box is comparatively deep, so that the rats are obliged to jump down from the upper box to the floor of the middle one. If several rats should be at the same time in the middle box, when the trap shutter 36 is released, they will not get a warning from the one that slips down the chute 35 and through the opening 33, as the chute and the side partition 34 will keep him out of sight when he dives from the middle to the bottom box, so that the other rats will not get scared or have a warning of any danger.

As the gate 50 can only work one way, it is impossible for the rat swimming around in the liquid to get out again. It is evident that after several rats have been drowned in the box, the float frame 47 would gradually rise and any excess of liquid will then run out through the aperture 46. This is necessary to permit sufficient room for the partition 56 to swing, when the gate 50 is depressed by a falling rat.

The reason for making the middle box deeper than the top one, is to compel the rat to jump down from the top floor to the next. By referring particularly to Figure 5 it will now be evident that as the opening 22 in the floor 10 is directly above the opening 33 in the floor 23 below, he will land on the shutter 36 aided by the chute 35. If at this time the locking bolt 39 has been removed, the fall of the rat will easily swing the shutter, so that he would pass quickly from the top floor, through the next and onto the gate 50, which will then swing and throw the rat into the water in the tank. It will thus be seen, as his timidity has been removed by keeping the shutter 36 locked, the rat will not hesitate in jumping down from the top floor onto the shutter 36 in the middle box.

Having thus described the invention what is claimed as new is:

1. An animal trap comprising a box-shaped structure having a plurality of stories divided by floors, the bottom story forming a tank, a float extending between the walls of the tank, corresponding openings provided in said floors and said float, and a balanced shutter normally closing the opening in the floor above the tank, the uppermost story being provided with an entrance.

2. An animal trap comprising a box-shaped structure having a plurality of stories divided by floors, the bottom story forming a tank, a float extending between the walls of the tank, corresponding openings provided in said floors and said float, and balanced shutters normally closing the openings in the floor above the tank and in said float, means for temporarily locking said shutter, the uppermost story being provided with an entrance, said upper story being divided into communicating compartments, and a curtain across the opening between said compartments.

3. An animal trap comprising a box-shaped structure having a plurality of stories divided by floors, the bottom story forming a tank, openings provided in said floors, a balanced shutter normally closing the opening in the floor above the tank, means for temporarily locking said shutter, the uppermost story being provided with an entrance, said upper story being divided into communicating compartments, a curtain across the opening between said compartments, a chute leading in the direction of said shutter, and a partition along the opening therefor.

4. An animal trap comprising a box-shaped structure having a plurality of stories divided by floors, the bottom story forming a tank, openings provided in said floors, a balanced shutter normally closing the opening in the floor above the tank, means for temporarily locking said shutter, the uppermost story being provided with an entrance, a float in said tank, said float being provided with an opening adapted to register with the opening in the floor above the tank, a gate normally closing said float opening, and a depending wall along said float opening.

5. An animal trap comprising a box-shaped structure having a plurality of stories divided by floors, the bottom story forming a tank, openings provided in said floors, a balanced shutter normally closing the opening in the floor above the tank, means for temporarily locking said shutter, the uppermost story being provided with an entrance, a float in said tank, said float being provided with an opening adapted to register with the opening in the floor above the tank, a gate normally closing said float opening, a depending wall along said float opening, said upper story being divided into communicating compartments, and a curtain across the opening between said compartments.

6. An animal trap comprising a box-shaped structure having a plurality of stories divided by floors, the bottom story forming a tank, openings provided in said floors, a balanced shutter normally closing the opening in the floor above the tank, means for temporarily locking said shutter, the uppermost story being provided with an entrance, a float in said tank, said float being provided with an opening adapted to register with the opening in the floor above the tank, a gate normally closing said float opening, a depending wall along said float opening, said upper story being divided into communicating compartments, a curtain across the opening between said compartments, a chute leading in the direction of said shutter, and a partition along the opening therefor.

7. An animal trap comprising a series of three boxes placed one above the other and secured in this position; the top box having a floor with a small opening, side walls and a roof covering and being divided into intercommunicating compartments, a curtain in the passageway between said compartments, and an entrance with a balcony furnished in one of the walls of the top box; the middle box having a floor with a small opening directly below the floor opening of the top box, a chute directed against said opening, a partition along the same, a shutter normally closing said opening, means for temporarily locking the shutter in closed position, an exit opening being provided in one of the side walls of said middle box, a balcony associated with said exit opening, and an outwardly opening gate covering said exit opening; the bottom box forming a tank partly filled with liquid, a float extending between the walls of the tank and having an opening directly below said floor openings, and a normally closed gate over said float opening.

In testimony whereof I affix my signature.

ABEL J. LOVE. [L. S.]